(12) United States Patent
Jian et al.

(10) Patent No.: US 10,589,470 B2
(45) Date of Patent: Mar. 17, 2020

(54) ANTI-SPILLAGE STRUCTURE

(71) Applicant: SHANGHAI HONGYAN RETURNABLE TRANSIT PACKAGINGS CO., LTD, Shanghai (CN)

(72) Inventors: Yuanli Jian, Shanghai (CN); Kai Gong, Shanghai (CN)

(73) Assignee: SHANGHAI HONGYAN RETURNABLE TRANSIT PACKAGINGS CO., LTD, Shanghai (CN)

( * ) Notice: Subject to any disclaimer, the term of this patent is extended or adjusted under 35 U.S.C. 154(b) by 0 days.

(21) Appl. No.: 15/549,013

(22) PCT Filed: Jan. 27, 2016

(86) PCT No.: PCT/CN2016/072346
§ 371 (c)(1),
(2) Date: Aug. 4, 2017

(87) PCT Pub. No.: WO2016/124092
PCT Pub. Date: Aug. 11, 2016

(65) Prior Publication Data
US 2018/0022039 A1    Jan. 25, 2018

(30) Foreign Application Priority Data
Feb. 6, 2015    (CN) .......................... 2015 1 0063964

(51) Int. Cl.
*B29C 65/00*    (2006.01)
*B29C 65/06*    (2006.01)
*B29C 65/08*    (2006.01)

(52) U.S. Cl.
CPC ............ *B29C 66/322* (2013.01); *B29C 65/06* (2013.01); *B29C 66/1142* (2013.01);
(Continued)

(58) Field of Classification Search
CPC . B29C 66/322; B29C 66/54; B29C 66/30223; B29C 66/1142; B29C 65/06; B29C 65/08; B29C 66/1312; Y10T 428/26
See application file for complete search history.

(56) References Cited

U.S. PATENT DOCUMENTS 3,973,064 A * 8/1976 Paine ...................... B29C 65/08
428/60
5,670,108 A * 9/1997 Kern ...................... B29C 65/20
156/292
(Continued)

FOREIGN PATENT DOCUMENTS

CN    2000127245    5/2000
CN    102269087    12/2011
(Continued)

OTHER PUBLICATIONS

[NPL-1] Tajima, Kohei (JP 2000-127245 A); May 2000, (EPO—Machine Translation to English). (Year: 2000).*
(Continued)

*Primary Examiner* — David Sample
*Assistant Examiner* — Donald M Flores, Jr.
(74) *Attorney, Agent, or Firm* — Hamre, Schumann, Mueller & Larson, P.C.

(57) ABSTRACT

Disclosed is an anti-spillage structure arranged on two components which are connected together by vibration friction welding. The two components include a base plate, the anti-spillage structure is provided with a main welding rib and a material-blocking plate, the main welding rib and the material-blocking plate are arranged on the same component or the main welding rib and the material-blocking plate are respectively arranged on the two components. An auxiliary welding rib is arranged at the top end of the material-blocking plate, when the two components are welded to each other, the base plate, the main welding rib, (Continued)

the material-blocking plate and the auxiliary welding rib enclose a spillage cavity, such that the spillage of the main welding rib generated in the welding process is fully accommodated in the spillage cavity.

10 Claims, 9 Drawing Sheets

(52) U.S. Cl.
CPC ........ *B29C 66/30223* (2013.01); *B29C 66/54* (2013.01); *B29C 65/08* (2013.01); *B29C 66/1312* (2013.01); *Y10T 428/26* (2015.01)

(56) References Cited

U.S. PATENT DOCUMENTS

| | | | | |
|---|---|---|---|---|
| 6,409,370 | B1 * | 6/2002 | Akiyama | B29C 65/06 362/267 |
| 6,532,928 | B2 * | 3/2003 | Ogata | B29C 65/06 123/184.61 |
| 2003/0056871 | A1 | 3/2003 | Nakajima et al. | |

FOREIGN PATENT DOCUMENTS

| | | | | |
|---|---|---|---|---|
| CN | 102490356 | | 6/2012 | |
| CN | 103696628 | A | 4/2014 | |
| CN | 203570001 | U | 4/2014 | |
| CN | 104284546 | | 1/2015 | |
| GB | 2217255 | A * | 10/1989 | ......... B29C 65/0672 |
| JP | 2000127245 | A * | 5/2000 | ......... B29C 66/1142 |

OTHER PUBLICATIONS

International Search Report for international application No. PCT/CN2016/072346, dated Apr. 19, 2016 (4 pages, including English translation).

The extended European search report issued in European Patent Application No. 16746085.6, dated Oct. 16, 2018, 6 pages provided.

* cited by examiner

ANTI-SPILLAGE STRUCTURE

FIELD

The present invention relates to a field of welding, in particularly to an anti-spillage structure.

BACKGROUND

It is well-known that plastic parts cannot be manufactured though molding by one time due to its construction, and welding process may be used subsequently for fusion manufacturing. Commonly used welding processes include conventional hot plate welding, infrared welding, ultrasonic welding and vibration friction welding and so on, wherein ultrasonic welding and vibration friction welding are increasingly used for their excellent properties such as low consumption, self-orthopedic and smoke-free. Both ultrasonic welding and vibration friction welding are based on the basic principles of the generation of heat by friction, but vibration friction welding can be applied to larger area and larger volume (weight) of the plastic parts of the welding. No matter which kinds of the welding technology are used, the spillage after welding is inevitable. The spillage volume is directly proportional to the amount of welding. When the quantities of welding is large, it's necessary to deal with the spillage by means of either the design of spillage in the non-use area, or the subsequent processing removal, or the design of the material-blocking edge, spillage slot to improve the appearance of the spillage. For the parts whose welding structure cannot be designed in the non-use of the visible areas, spillage slot or subsequent processing removal are generally used to deal with the spillage when hit hot plate welding and infrared welding, and the material-blocking edge would be used to improve the appearance of the spillage when vibration friction welding is used. The amount of the welding is very limited when ultrasonic welding is used, so welding spillage is not discussed.

According to the welding result of our company actual products and other products on the site, the welding spillage of the vibration friction welding for the welding construction parallel to vibration direction differs from that perpendicular to vibration direction, and the difference is quite large. The welding spillage of welding ribs parallel to the vibration direction extends toward outside in the form of the sheet and has a wool-like outer end, and the degree of the spillage overflowing is larger, while the welding spillage of welding ribs perpendicular to the vibration direction is mostly in the form of extrusion paste and stick to welding ribs, and the degree of the spillage overflowing is small.

FIG. 1 is a schematic view of the welding design according to the general design guide of the welding block. As shown in FIG. 1, a component 100 and a component 200 are welded together by vibration friction welding and form a melt glue zone 202, wherein the component 200 is provided with a material-blocking edge 201. As illustrated in FIG. 1, the material-blocking edge 201 fails to completely seal a spillage zone 203, and therefore the material-blocking edge is generally able to confine the welding rib spillage perpendicular to the vibration direction but is unable to completely shield the welding rib spillage parallel to the vibration direction. In addition, the thickness of the material-blocking edge 201 is generally smaller.

In addition, for welding productions whose applicable environment is required to be hygienic, if material-blocking edge cannot be well aligned with the opposite side due to difference of molding size or failure for vibration welding mold to adjust in place, the cavity between the material-blocking edge and welding ribs will instead become a filthy place and hard to clean.

SUMMARY

Object of the present invention is to effectively improve the spillage in the case of the manufacturing difficulty not being increased, and at the same time, solving the problem of dirt being contained that is generated at conventional welding material-blocking edge.

In order to achieve the above object, the present invention provides an anti-spillage structure arranged on two components which are connected together by vibration friction welding, and the two components comprising a base plate, wherein the anti-spillage structure is provided with a main welding rib and a material-blocking plate, the main welding rib and the material-blocking plate are arranged on the same component or the main welding rib and the material-blocking plate are respectively arranged on the two components, and an auxiliary welding rib is arranged at the top end of the material-blocking plate, when the two components are welded to each other, the base plate, the main welding rib, the material-blocking plate and the auxiliary welding rib enclose a spillage cavity, such that the spillage of the main welding rib generated in the welding process is fully accommodated in the spillage cavity.

Preferably, during the welding process, the main welding rib is welded and then the auxiliary welding rib is welded.

Preferably, the welding area of the auxiliary welding rib is 0.05~0.5 times that of the main welding rib.

Preferably, the auxiliary welding rib has a width larger than or equivalent to 0.3 mm.

Preferably, the auxiliary welding rib has a width being 0.3 mm-1.5 mm.

Preferably, the auxiliary welding rib has a slope, which is located on one side of the spillage cavity facing away from the auxiliary welding rib.

Preferably, the slope has an angle being 45°~60°.

Preferably, the width of the top surface of the auxiliary welding rib is larger than or equivalent to 0.3 mm.

Preferably, the top end of the main welding rib is a main melted zone having a thickness Ha and a width Wa meeting the following relationship: 1 mm≤Ha≤2.5 mm or 2 mm≤Wa≤4 mm.

Preferably, the material-blocking plate is further provided an art trench which is used for concealing the relative misalignment of the two components when the relative dimension deviation of the two components is large.

Preferably, the top end of the main welding rib is a main melted zone, which has a thickness Ha and a width Wa meeting the following relationship: 2.5 mm, and 2 mm≤Wa≤4 mm Preferably, the top end of the main welding rib is a main melted zone, and the top end of the auxiliary welding rib is an auxiliary melted zone, and a thickness Ha of the main melted zone of the main welded rib and a thickness Hb of the auxiliary melted zone of the auxiliary melted rib meet the following relationship: 0.25Ha≤Hb≤0.5Ha.

Preferably, the width of the material-blocking plate is larger than or equivalent to that of the main welding rib.

The anti-spillage structure of the present invention is provided with an auxiliary welding rib, which is welded to the opposite side when the main welding rib approaches to the end of welding, so that influence on the power of welding equipment is small, and meanwhile the appearance is affected hardly due few welding spillage of the auxiliary welding itself. In the condition of the large relative dimension deviation of the components, the optional art trench can conceal the relative misalignment of two welding components, so as to improve the appearance of the products.

DETAILED DESCRIPTION OF EMBODIMENTS

Figure 1:
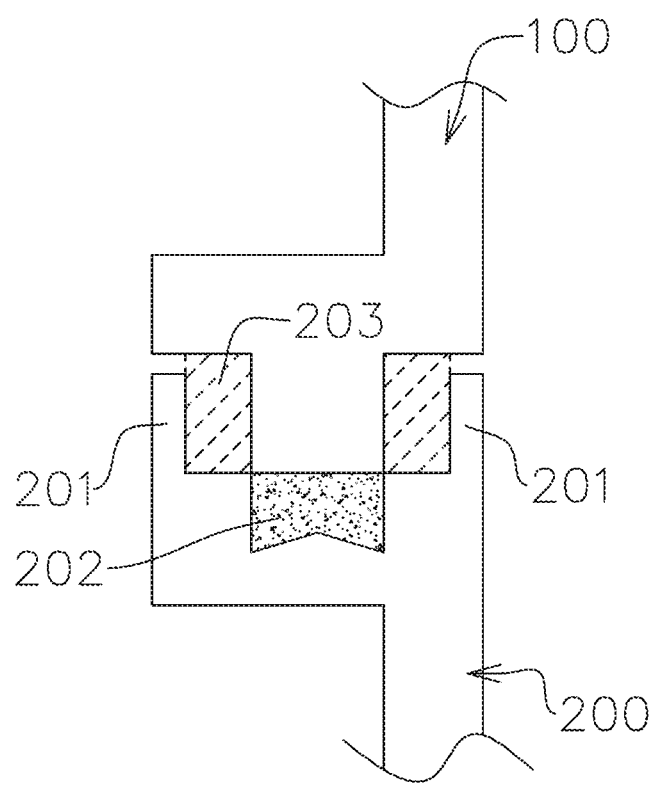
FIG. 1 is a schematic view of a prior art weld design.

Preferred embodiments of the present invention will now be described in detail with reference to the accompanying drawing in order to provide a clearer understanding of the objects, features and advantages of the present invention. It is to be understood that the embodiments shown in the drawings are not intended to limit the scope of the invention, but merely to illustrate the spirit of the invention.

As shown in FIGS. 2-9, an anti-spillage structure is provided on a component 1 and a component 2 welded together by vibration friction welding, and the component 1 and component 2 comprise a base plate 10 and a base plate 20. The anti-spillage structure is provided with a main welding rib 11 and a material-blocking plate 12. Both the main welding rib 11 and the material-blocking plate 12 are arranged on the component 1 or the component 2, or the main welding rib 11 and the material-blocking 12 are respectively arranged on the component 1 and component 2, wherein an auxiliary welding rib 13 is provided on the top of the material-blocking plate 12. When the component 1 and the component 2 are welded to each other, the base plate 10, the base plate 20, the main welding rib 11, the material-blocking plate 12 and the auxiliary wedding rib 13 enclose a spillage cavity 16, so that the spillage of the main welding rib generated during the welding process is completely accommodated in the spillage cavity 16.

Embodiment-1

Figure 2:
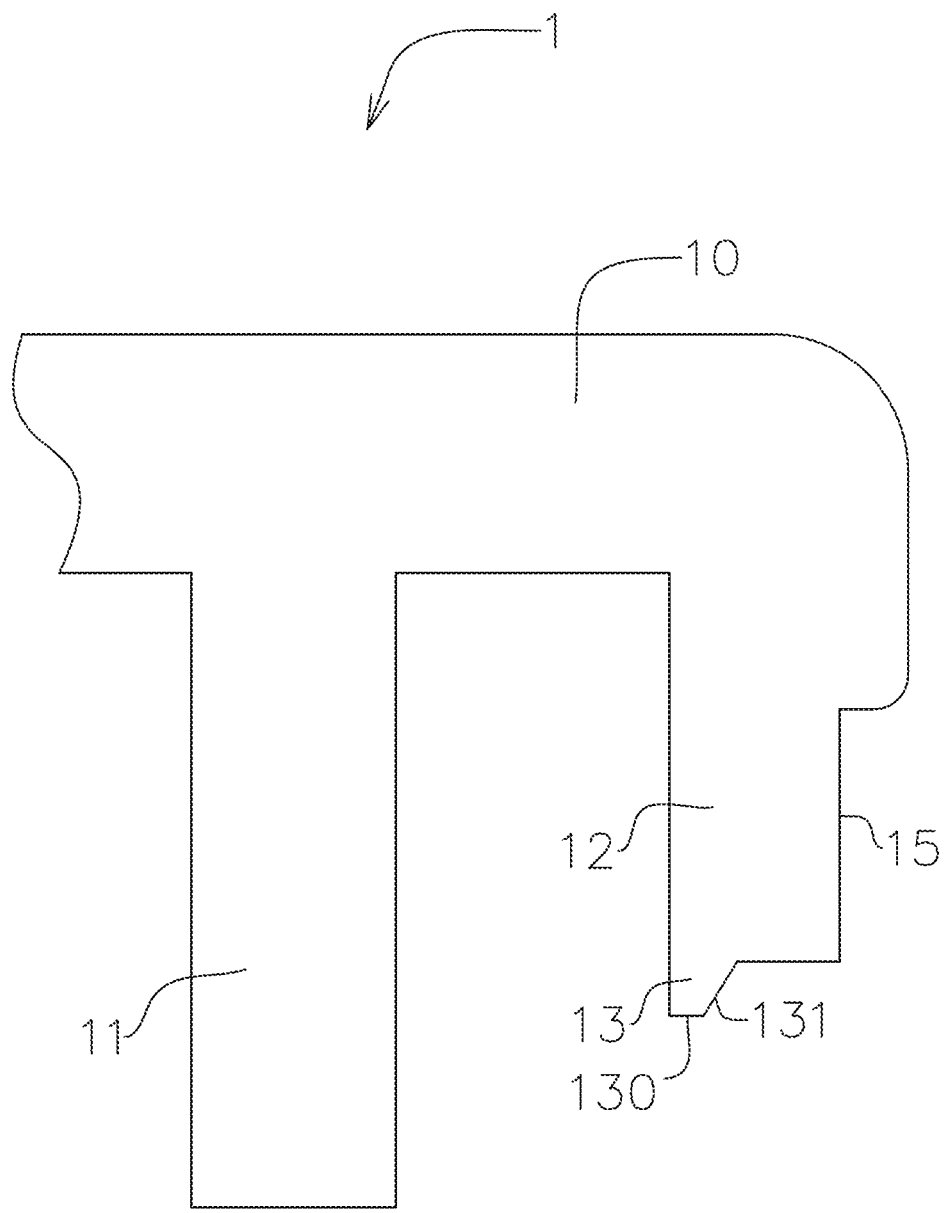
FIG. 2 is a partial schematic view of a member 1 according to the first embodiment of the present invention.

FIG. 2 is a partial schematic view of the component 1 of the present embodiment. As shown in FIG. 2, the component 1 comprises a base plate 10, a main welding rib 11, a material-blocking plate 12 and an auxiliary welding rib 13, wherein the auxiliary welding rib 13 is provided on the material-blocking plate 12, and the auxiliary welding rib 13 and the main welding rib 11 extends from the base plate 10 towards the same direction. Preferably, the width of the material-blocking plate 12 is larger than or equivalent to that of the main welding rib 11, and the welding area of the auxiliary welding rib 13 is 0.05~0.5 times the welding area of the main welding rib 11.

As shown in FIG. 2, in the present embodiment, the auxiliary welding rib 13 has a slope 131 which is located one side of the auxiliary welding rib 13 facing away from the main welding rib 11. The angle formed by the slope 131 and the horizontal plane (the drawing direction) is 45° to 60° and the width of the top surface 130 of the auxiliary welding rib 13 is no less than 0.3 mm. However, it will be understood for the skilled in the art that the auxiliary welding rib 13 may also have no slope. In this case, the width of the auxiliary welding rib is larger than or equivalent to 0.3 mm. Preferably, the width of the auxiliary welding rib is 0.3 min-1.5 mm.

In the present embodiment, the material-blocking plate 12 is further provided with an art trench 15 used for concealing the relative misalignment between the component 1 and the component 2 when the relative size deviation of the component 1 and the component 2 is large, so as to improve the appearance of the production.

Figure 3:
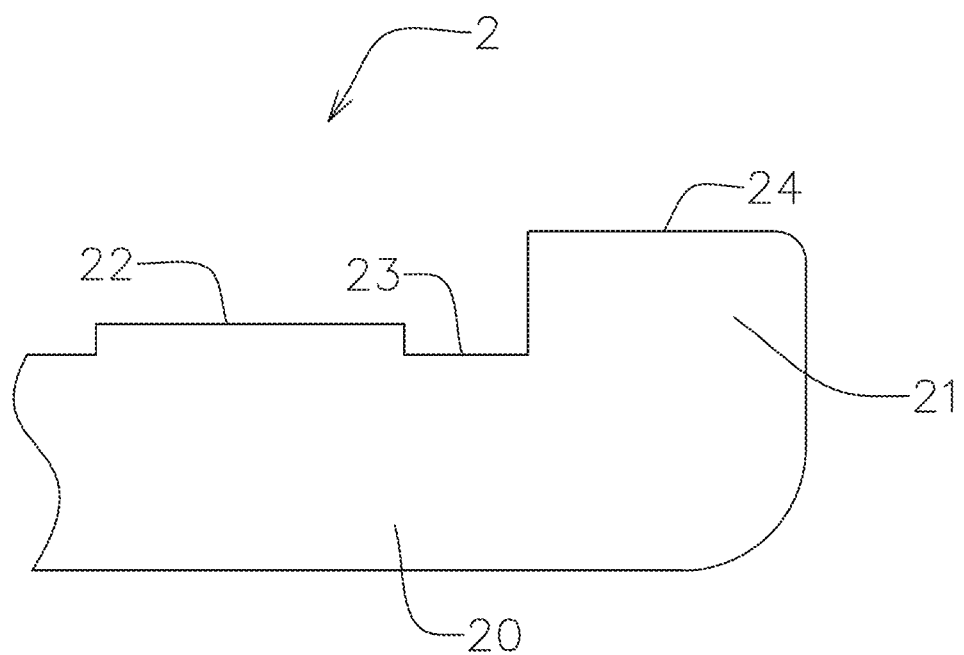
FIG. 3 is a partial schematic view of a member 2 according to the first embodiment of the present invention.

FIG. 3 is a partial schematic view of the component 2 of the present embodiment. As shown in FIG. 3, the component 2 comprises a base plate 20, an outer side plate 21, a main welding base surface 22 and auxiliary welding base surface 24. Wherein the main welding base surface 22 is provided on the base plate 20, and the auxiliary welding base surface 24 is provided on the outer side plate 21. Preferably, the component 1 further comprises a saving material slot 23 which is located on either or both sides of the welding base surface 22.

Figure 4:
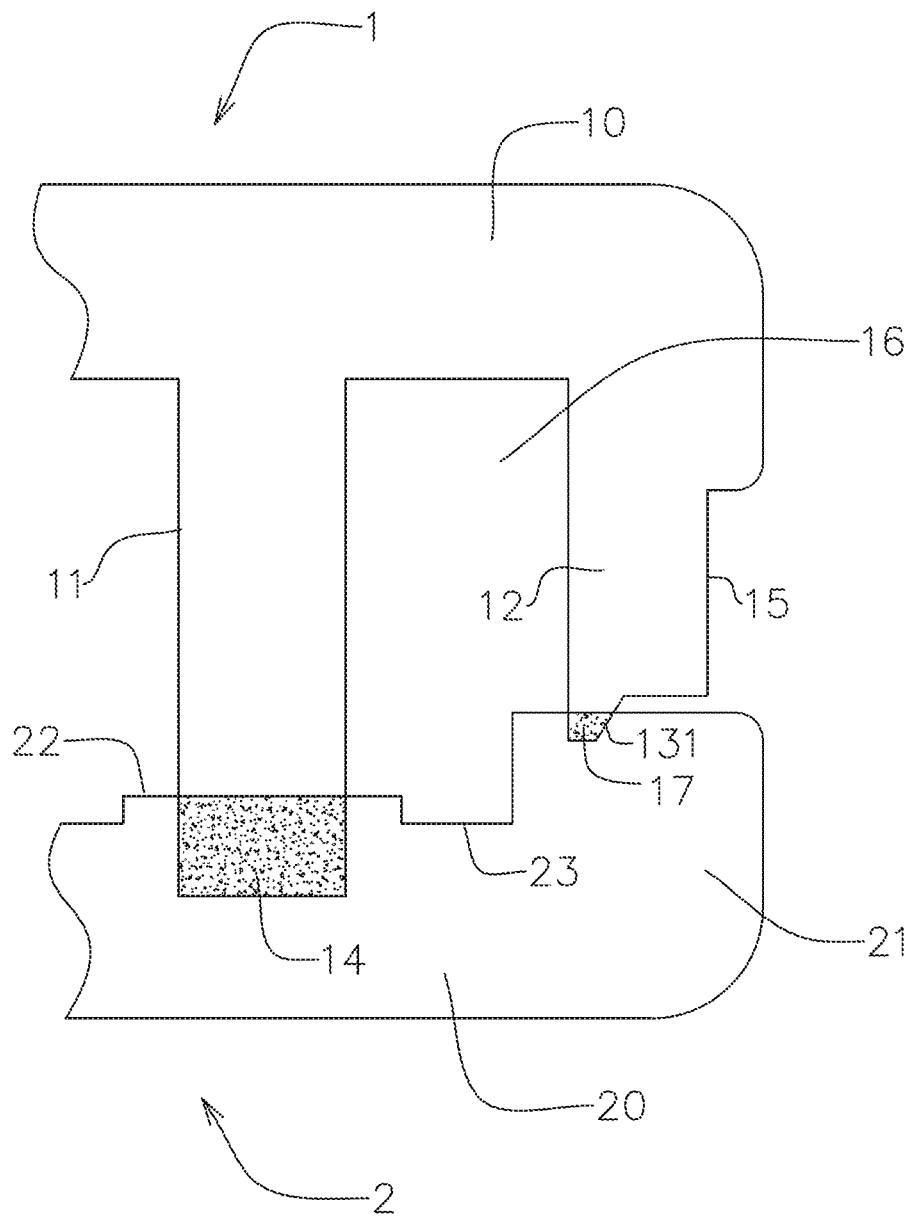
FIG. 4 is a schematic view of the member 1 and member 2 according to the first embodiment of the present invention welded together.

FIG. 4 is a schematic view of the component 1 and component 2 welded together by vibration friction welding. As shown in FIG. 4, the top end of the main welding rib 11 of the component 1 is a main melt zone 14, and the top end of the auxiliary welding rib 13 of the component 1 is an auxiliary melted zone 17. The main welding rib 11, the base plate 10, the base plate 20, the material-blocking pate 12 and the auxiliary welding rib 13 enclose a spillage cavity 16. Preferably, the thickness Ha and width Wa of the main melted zone 14 meet the following relationship: 1 mm≤Ha≤2.5 mm or 2 mm≤Wa≤4 mm. And the thickness Ha of the main melted zone 14 and the thickness Hb of the auxiliary melted zone 17 meet the following relationship: 0.25Ha≤Hb≤0.5Ha.

During the welding process, the main welding rib 11 is first in contact with the main welding base surface 22 and majority of the welding is completed. Then the auxiliary welding rib 13 is brought into contact with the outer side plate 2*l* when the main welding rib 11 approaches to the end of welding. And in the subsequent welding process, the auxiliary welding rib 13 is welded on the auxiliary welding base surface 24, so as to enclose the spillage cavity 16 with material-blocking plate 12, and main welding rib 11. During the welding process, the spillage of the main welding rib 11 is accumulated in the spillage cavity 16 and the welding spillage of the main welding rib would not overflow from the spillage cavity 16 due to the auxiliary welding rib 13 welded to the outer side plate 21. Therefore, after the welding is completed, it is not necessary to perform the removal of the spillage for the main welding rib 11.

For the spillage generated by the auxiliary welding rib 13, only small amount of work should be implemented to remove spillage for the reason that the auxiliary welding rib 13 is far smaller than the main welding rib 11, thus greatly saving the labor and solving the filth problem caused by the conventional welding material-blocking edge.

According to the parameters of existing machinery and equipment in market, the work waveforms used in the vibration friction welding are mostly two specifications with amplitude 1 mm, frequency 200 Hz and amplitude 2 mm, frequency 100 Hz. The latter is suitable for the application requirements with relative larger volume and relative deeper welding depth and can provide better welding strength but its spillage is also more. The size requirements of the main welding rib and the auxiliary rib will be specifically described below regarding to the waveform with the specification of amplitude 2 mm, frequency 100 Hz.

The following description will be made with reference to FIG. 5.

Assuming: the maximum weld dimension of the component 1 is d1; the corresponding maximum weld dimension of the component 2 is d2; and the relative dimensional deviation between the component 1 and component 2 is K, wherein K=|d1−d2|.

Figure 5:
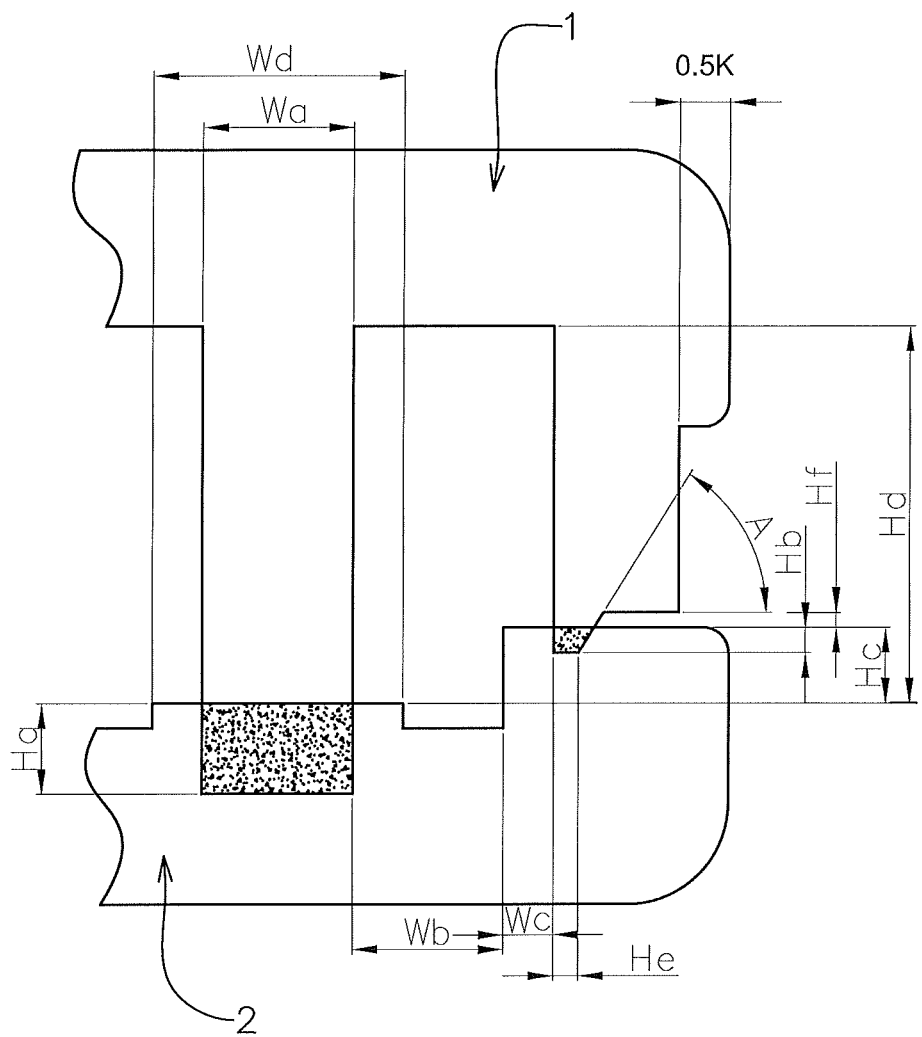
FIG. 5 shows sizes of various parts of the member 1 and member 2 according to the first embodiment of the present invention.

FIG. 5 shows sizes of various parts of the component 1 and component 2 according to the first embodiment of the present invention. As shown in FIG. 5: the width of the main welding rib 11 is Wa; the depth of the main melted zone 14 is Ha; the width of the main welding base surface 22 of the component 2 is Wd; the distance between the edge of the main melted zone 14 and the edge of the saving material slot 23 is Wb; the distance between the edge of the saving material slot 23 and the edge of the auxiliary melted zone 17 is Wc; the length of the main welding ridge 11 minus the depth of the main melted zone 14 is Hd; the depth of the auxiliary melted zone 17 is Hb; the distance between the main welding base surface 22 and the auxiliary welding surface 24 is Hc; The width of the top surface of the auxiliary welding rib 13 is He; the height of the auxiliary welding rib 13 minus the thickness of the auxiliary melted zone 17 is Hf; and the inclination angle of the slope 131 of the auxiliary welding rib 13 is A.

Preferably, for the welding structure parallel to the vibration direction, the above dimensions meet the following relationship:

$Hc \geq 0.8Ha;$ $Hd \geq Ha;$ $Wd \geq Wa+K;$ $Wb \geq 0.5(Wa+K);$ $Wc = 0.5K;$ $He \geq 0.3$ mm;

Hb≈0.3Ha, that is, the welding cross-sectional area of the auxiliary welding rib is required to be as small as possible meanwhile to ensure sealing inside of the spillage cavity;

$Hc \geq 0.8Ha;$ and $Hd \geq Ha.$

Preferably, for the welding structure perpendicular to the vibration direction, the above dimensions meet the following relationship:

$Hc \geq 0.8Ha;$ $Hd \geq Ha;$ $Wd \geq Wa+K+2\times2,$ that is, Wd is equal to or greater than the width of the welding rib plus the relative dimension deviation and plus double amplitudes;

$Wb \geq 0.5 \times Wa+2,$ the reason why the cross-sectional width Wb at this time requires contact with relative dimensional deviation is that the space with an amplitude of 2 mm is returned to the vibration origin after the vibration friction welding is completed; and $Wc=2.$ Embodiment-2

The main difference between the present embodiment and the embodiment 1 is that the main welding rib and the auxiliary welding rib are respectively provided on different components. A second embodiment of the present invention will be described with reference to FIGS. 5-8.

Figure 6:
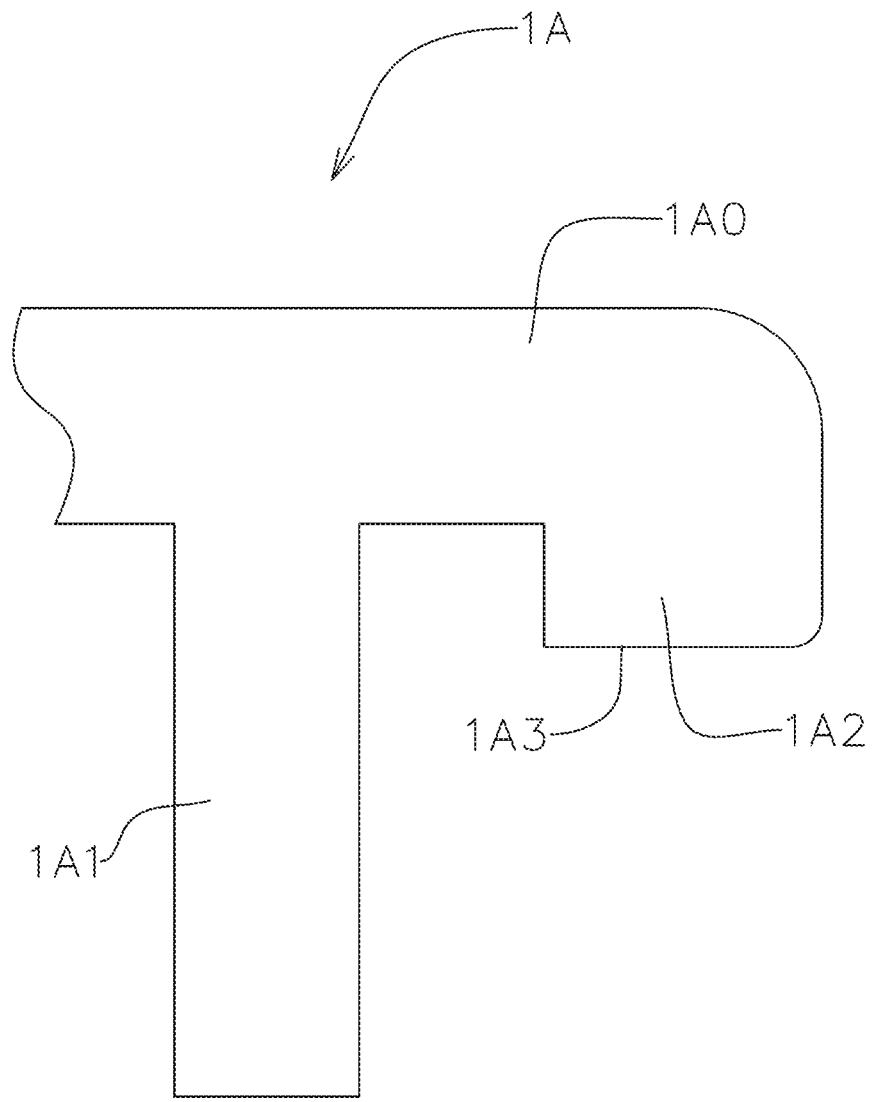
FIG. 6 is a partial schematic view of a member 1A according to the second embodiment of the present invention.

FIG. 6 is a partial schematic view of the component 1A of the present embodiments. As shown in FIG. 6, the component 1A comprises a base plate 1A0, a main welding rib 1A1, an outer side plate 1A2, and an auxiliary welding base surface 1A3. Wherein, the main welding rib 1A1 extends from the base plate 1A0.

Figure 7:
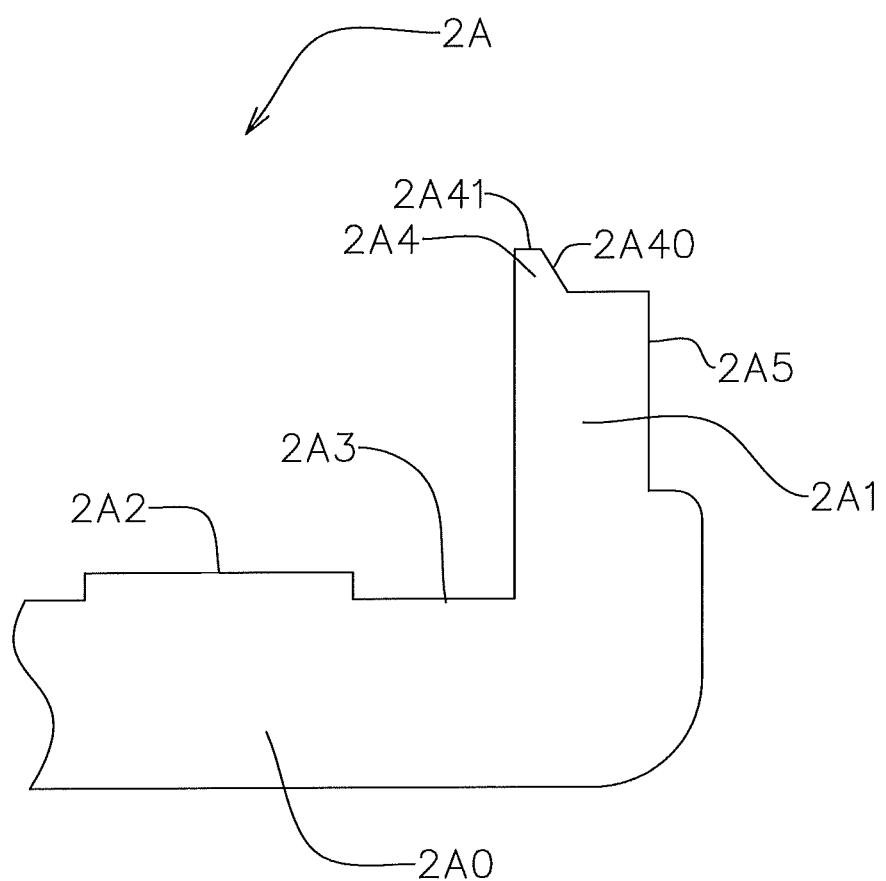
FIG. 7 is a partial schematic view of a member 2A according to the second embodiment of the present invention.

FIG. 7 is a partial schematic view of the component 2A of the present embodiment. As shown in FIG. 7, the component 2A comprises a base plate 2A0, a material-blocking plate 2A1, a main welding surface 2A2, and an auxiliary welding rib 2A4. The auxiliary welding rib 2A4 extends from the material-blocking plate 2A1.

In the present embodiment, the auxiliary welding rib 2A4 has a slope 2A40, which is located on one side of the auxiliary welding 2A4 facing away from the main welding rib 1A1. The angle formed by the slope 2A41 and the horizontal plane (shown in figures) is 45~60°, and the width of the top surface 2A41 of the auxiliary welding rib is no less than 0.3 mm. However, it should be understood for the skilled in the art that the auxiliary welding rib may also have not slope. In this case, the width of the auxiliary welding rib is larger than or equivalent to 0.3 mm. Preferably, the width of the auxiliary welding rib is 0.3 mm-1.5 mm.

Preferably, the width of the material-blocking plate 2A1 is larger than or equivalent to the width of the main welding rib 1A1, and welding area of the auxiliary welding rib 2A4 is 0.05~0.5 times the welding area of the main welding rib 1A1.

In the present embodiment, the base plate 2A0 is further provided with a saving material slot 2A3, and the material-blocking plate 2A1 has an art trench 2A5 used for concealing the relative misalignment between the component 1A and the component 2A when the relative size deviation of the component 1A and the component 2A is large, so as to improve the appearance of the production.

Figure 8:
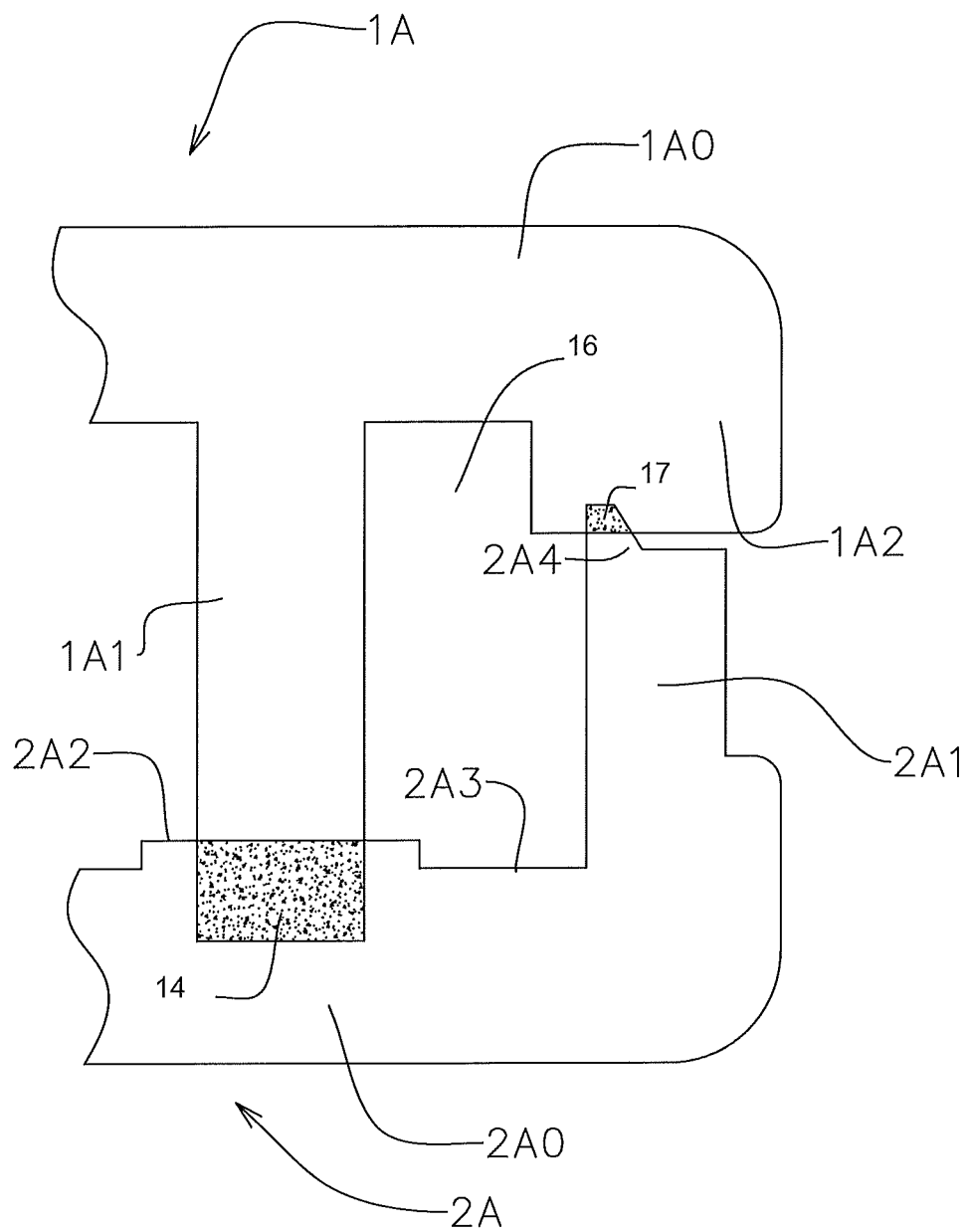
FIG. 8 is a schematic view of the member 1A and member 2A according to the second embodiment of the present invention welded together.

FIG. 8 is a schematic view of the component 1A and the component 2A welded together by vibration friction welding. As shown in FIG. 8, the top end of the main welding rib 1A1 of the component 1A is a main melted zone 14, and the top end of the component 2A is an auxiliary melted zone 17. The main welding rib 1A1, the material-blocking plate 2A1 and the auxiliary welding rib 2A4 enclose a spillage cavity 16. Preferably, the thickness Ha and the width Wa of the main melted zone 14 meet the following relationship: 0.25Ha≤Hb≤0.5Ha.

During the welding process, the main welding rib 1A1 is first in contact with the main welding base surface 2A2 and welded. Then the auxiliary welding rib 2A4 is brought into contact with the auxiliary welding base surface 1A3 of the outer side plate 1A2 when the main welding rib 1A1 approaches to the end of welding, and auxiliary welding rib 2A4 is welded to the auxiliary welding base surface 1A3 of the outer side plate 1A2 and enclose a spillage cavity 16 with the main welding rib 1A1, material-blocking plate 2A1 and auxiliary welding rib 2A4. During the process, the spillage of the main welding rib 1A1 is accumulated in the spillage cavity 16 and will not overflow from the spillage cavity 16 as the auxiliary welding rib 2A4 is welded to the outer side plate 1A2. Therefore, after the welding is completed, it is not necessary to perform the additional removal of the spillage for the main welding rib 1A1.

For the spillage generated by the auxiliary welding rib 2A4, only small amount of work should be implemented to remove the spillage for the reason that the auxiliary welding rib 2A4 is far smaller than the main welding rib 1A1, thus greatly saving the labor and solving the filth problem caused by the conventional welding material-blocking edge.

According to the parameters of existing machinery and equipment in market, the work waveforms used in the vibration friction welding are mostly two specifications with amplitude 1 mm, frequency 200 Hz and amplitude 2 mm, frequency 100 Hz. The latter is suitable for the application requirements with relative larger volume and relative deeper welding depth and can provide better welding strength, but its spillage is also more. The size requirements of the main welding rib and the auxiliary rib will be described below regarding to the waveform with specification of amplitude 2 mm, frequency 100 Hz.

The following description will be made with reference to FIG. 9.

Assuming: the maximum weld dimension of the component 1A is d1; the corresponding maximum weld dimension of the component 2A is d2; and the relative dimensional deviation between the component 1A and component 2A is K and wherein K=|d1−d2|.

Figure 9:
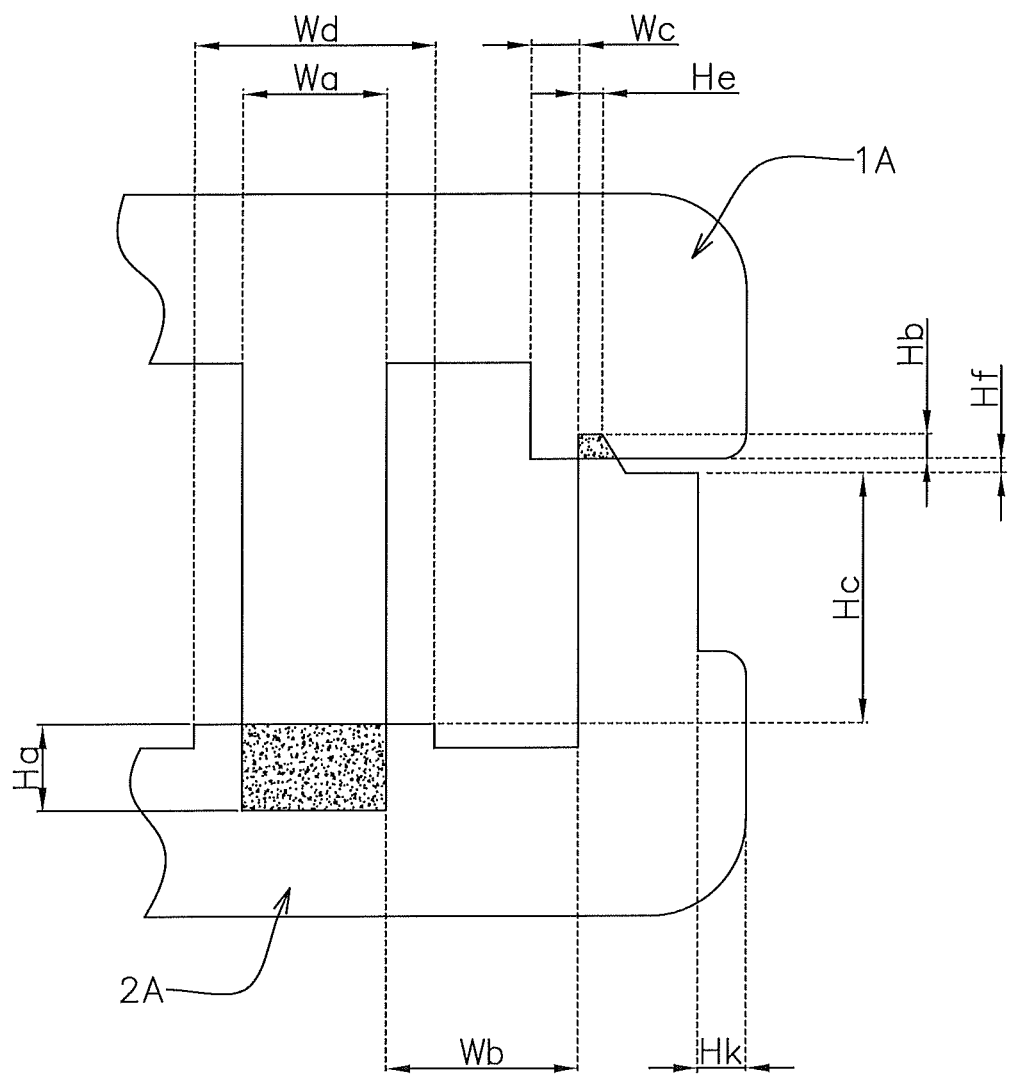
FIG. 9 shows sizes of various parts according to the member 1 and member 2 according to the second embodiment of the present invention.

As shown in FIG. 9, the width of the main welding rib 1A1 is Wa, the depth of the main melted zone 14 is Ha, the width of the welding base surface 2A2 of the component 2A is Wd, the distance between the edge of the main melted zone 14 and the edge of the saving material slot 23 is Wb, the distance between the edge of the auxiliary melted zone 17 and the edge of the auxiliary welding base surface 1A3 is Wc, the dimension which the length of the main welding rib 1A1 minus the depth of the main melted zone 14 is Hd, the distance between the top end of the material-blocking plate 2A1 and the main welding base surface 2A2 is Hc, the width of the top surface of the auxiliary welding rib 2A4 is He, and the height of the auxiliary welding rib 2A4 minus the thickness of the auxiliary melted zone 17 is Hf, and the thickness of the art trench is Hk.

Preferably, for the welding structure parallel to the vibration direction, the above dimensions meet the following relationships:

The value of Wa and Ha is determined according to the welding strength requirements, and for the high strength welding requirements, generally Wa=2~4, Ha=1~2;

$Wd \geq Wa+K;$ $Wb \geq 0.5(Wa+K);$ $Wc=0.5K;$

The width of the top surface of the auxiliary welding rib is no less than 0.3 mm, Hb≈0.3Ha, that is the welding cross-sectional area of the auxiliary welding rib is required to be as small as possible meanwhile to ensure sealing inside of the spillage cavity; and $Hc \geq 5 \times Ha.$ Preferably, for the welding structure perpendicular to the vibration direction, the above dimensions meet the following relationships:

Wd≥Wa+K+2×2, that is, Wd is equal to or greater than the width of the welding rib plus the relative dimension deviation and plus double amplitudes;

Wb≥0.5×Wa+2, the reason why the cross-sectional width Wb at this time requires contact with relative dimensional deviation is that the space with an amplitude of 2 mm is returned to the vibration origin after the vibration friction welding is completed; and $Wc=2.$ The significant difference between the welding structure of embodiment-1 and embodiment-2 and that of the general vibration friction is that the material-blocking plate is provided with an auxiliary welding rib, which is welded to the opposite side when the main welding rib approaches to the end of welding, so that influence on the power of welding equipment is small, and meanwhile the appearance is affected hardly due few welding spillage of the auxiliary welding itself. In the condition of the large relative dimension deviation of the components, the optional art trench can conceal the relative misalignment of two welding components, so as to improve the appearance of the products.

While the preferred embodiments of the present invention have been described in detail above, it will be understood for those skilled in the art that various changes and modifications can be made therein without departing from the above teachings of the present invention. These equivalents are also intended to be within the scope of the claims appended hereto.

What is claimed is:

1. An anti-spillage structure arranged on two components which are connectable by vibration friction welding, each of the two components comprises a base plate, wherein the anti-spillage structure is provided with a main welding rib and a material-blocking plate, the main welding rib and the material-blocking plate are arranged on one component or the main welding rib and the material-blocking plate are respectively arranged on the two components, and an auxiliary welding rib is arranged at the top end of the material-blocking plate, when the two components are welded to each other, the base plate, the main welding rib, the material-blocking plate and the auxiliary welding rib enclose a spillage cavity, such that the spillage of the main welding rib generated in the welding process is fully accommodated in the spillage cavity, the top end of the main welding rib is a main melted zone, and the top end of the auxiliary welding rib is an auxiliary melted zone, the main melted zone has larger area than auxiliary melted zone,
wherein during the welding process, the main welding rib is welded and then the auxiliary welding rib is welded, and the auxiliary rib is welded when the main welding rib approaches to the end of welding,
wherein the main welding rib and the material-blocking plate have different shapes, and
wherein the width of the auxiliary welding rib is larger than or equivalent to 0.3 mm.

2. The anti-spillage structure according to claim 1, wherein the welding area of the auxiliary welding rib is 0.05~0.5 times that of the main welding rib.

3. The anti-spillage structure according to claim 1, wherein the auxiliary welding rib has a slope, which is located on one side of the spillage cavity facing away from the auxiliary welding rib.

4. The anti-spillage structure according to claim 3, wherein the angle of the slope is 45°-60°.

5. The anti-spillage structure according to claim 3, wherein the top surface of the auxiliary welding rib has a width larger than or equivalent to 0.3 mm.

6. The anti-spillage structure according to claim 1, wherein the top end of the main welding rib is a main melted zone having a thickness Ha and a width Wa which meet the following relationship: 1 mm≤Ha≤2.5 mm, or 2 mm≤Wa≤4 mm.

7. The anti-spillage structure according to claim 1, wherein the main welding rib and the auxiliary welding rib have different shapes.

8. The anti-spillage structure according to claim 1, wherein there is no auxiliary welding rib formed on the main welding rib.

9. An anti-spillage structure arranged on two components which are connectable by vibration friction welding, each of the two components comprises a base plate, wherein the anti-spillage structure is provided with a main welding rib and a material-blocking plate, the main welding rib and the material-blocking plate are arranged on one component or the main welding rib and the material-blocking plate are respectively arranged on the two components, and an auxiliary welding rib is arranged at the top end of the material-blocking plate, when the two components are welded to each other, the base plate, the main welding rib, the material-blocking plate and the auxiliary welding rib enclose a spillage cavity, such that the spillage of the main welding rib generated in the welding process is fully accommodated in the spillage cavity, and wherein the top end of the main welding rib is a main melted zone having a thickness Ha and a width Wa which meet the flowing relationship: 1 mm≤Ha≤2.5 mm, and 2 mm≤Wa≤4 mm.

10. An anti-spillage structure arranged on two components which are connectable by vibration friction welding, each of the two components comprises a base plate, wherein the anti-spillage structure is provided with a main welding rib and a material-blocking plate, the main welding rib and the material-blocking plate are arranged on one component or the main welding rib and the material-blocking plate are respectively arranged on the two components, and an auxiliary welding rib is arranged at the top end of the material-blocking plate, when the two components are welded to each other, the base plate, the main welding rib, the material-blocking plate and the auxiliary welding rib enclose a spillage cavity, such that the spillage of the main welding rib generated in the welding process is fully accommodated in the spillage cavity, and wherein the top end of the main welding rib is a main melted zone, and the top end of the auxiliary welding rib is an auxiliary melted zone, and a thickness Ha of the main melted zone of the main welded rib and a thickness Hb of the auxiliary melted zone of the auxiliary melted rib which meet the following relationship: 0.25Ha≤Hb≤0.5 Ha.

* * * * *